(12) United States Patent
Natanzon et al.

(10) Patent No.: US 8,103,937 B1
(45) Date of Patent: Jan. 24, 2012

(54) CAS COMMAND NETWORK REPLICATION

(75) Inventors: Assaf Natanzon, Ramat-Gan (IL); Yuval Aharoni, Kfar-Saba (IL)

(73) Assignee: EMC Corporation, Hopkinton, MA (US)

( * ) Notice: Subject to any disclaimer, the term of this patent is extended or adjusted under 35 U.S.C. 154(b) by 28 days.

(21) Appl. No.: 12/751,748

(22) Filed: Mar. 31, 2010

(51) Int. Cl.
G06F 11/00 (2006.01)
(52) U.S. Cl. ........ 714/763; 714/38.1; 711/150; 711/152
(58) Field of Classification Search .................. None
See application file for complete search history.

(56) References Cited

U.S. PATENT DOCUMENTS

| 5,446,862 | A  | * | 8/1995  | Ohkami | 711/100 |
| 5,579,505 | A  | * | 11/1996 | Ohkami | 711/155 |
| 6,233,585 | B1 | * | 5/2001  | Gupta et al. | 1/1 |
| 6,330,612 | B1 | * | 12/2001 | Boonie et al. | 709/229 |
| 6,449,700 | B2 | * | 9/2002  | Hagersten et al. | 711/152 |
| 6,904,556 | B2 | * | 6/2005  | Walton et al. | 714/766 |
| 7,149,853 | B2 | * | 12/2006 | Krueger | 711/150 |
| 7,159,215 | B2 | * | 1/2007  | Shavit et al. | 718/100 |
| 7,191,300 | B2 | * | 3/2007  | Abuaiadh et al. | 711/165 |
| 7,219,198 | B2 | * | 5/2007  | Sivaram et al. | 711/150 |
| 7,464,208 | B2 | * | 12/2008 | Tu et al. | 710/200 |
| 7,516,287 | B2 | * | 4/2009  | Ahal et al. | 711/162 |
| 7,596,738 | B2 | * | 9/2009  | Chessin et al. | 714/763 |
| 7,769,928 | B1 | * | 8/2010  | Tran et al. | 710/61 |
| 7,805,577 | B1 | * | 9/2010  | Mattina et al. | 711/151 |
| 2002/0004886 | A1 | * | 1/2002 | Hagersten et al. | 711/141 |
| 2003/0005029 | A1 | * | 1/2003 | Shavit et al. | 709/107 |
| 2004/0059563 | A1 | * | 3/2004 | Motyka et al. | 703/26 |
| 2004/0098723 | A1 | * | 5/2004 | Radovic et al. | 718/104 |
| 2005/0138319 | A1 | * | 6/2005 | Abuaiadh et al. | 711/170 |
| 2007/0233970 | A1 | * | 10/2007 | Saha et al. | 711/152 |
| 2007/0234006 | A1 | * | 10/2007 | Radulescu et al. | 712/28 |
| 2008/0126842 | A1 | * | 5/2008 | Jacobson et al. | 714/6 |

* cited by examiner

*Primary Examiner* — Christopher McCarthy

(74) *Attorney, Agent, or Firm* — Krishnendu Gupta; Joseph D'Angelo

(57) ABSTRACT

In an embodiment, a method and computer product is presented for executing a command in a replicated environment comprising a replication appliance and a production site, the method comprising: intercepting the command at a splitter; wherein the command comprises a atomic test and set request.

20 Claims, 9 Drawing Sheets

CAS COMMAND NETWORK REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

In an embodiment, a method and computer product is presented for executing a command in a replicated environment comprising a replication appliance and a production site, the method comprising: intercepting the command at a splitter; wherein the command comprises a atomic test and set request, adding the meta data associated with the command to a backlog, sending the meta data to the replication appliance, determining success of the meta data at the production site, based on a failure of the meta data, determining the type of failure, based on a determination of a failure, executing a failure determination comprising, determining whether the failure is a command not supported command, based on a positive determination that the failure is a command not supported, failing the ATS command; and, based on a negative determination that the command is not supported moving the splitter to MOH mode, based on success of the meta data, proceeding with processing of the command at the production site; and sending the ATS command to storage.

In an alternative embodiment, a method and computer product is presented for executing a command in a replicated environment, the replicated environment running in virtual access mode, the method comprising, intercepting the command at a splitter; wherein the command comprises an atomic test and set request, sending read notification to the replication appliance, reading a block associated with the command on the storage, sending write execution before read command, containing the data read from the storage, sending the ATS command to the replication appliance, and checking the status of the command and returning status to the command generator.

In a further embodiment, a method and program product is presented for executing a command in a replicated environment comprising a replication appliance and a production site, the replicated environment running in target side processing mode, the method comprising intercepting the command at a splitter; wherein the command comprises atomic test and set, reading from the volume, sending the data read from the volume to the replication appliance; and sending the command to volume.

DETAILED DESCRIPTION

Figure 1:
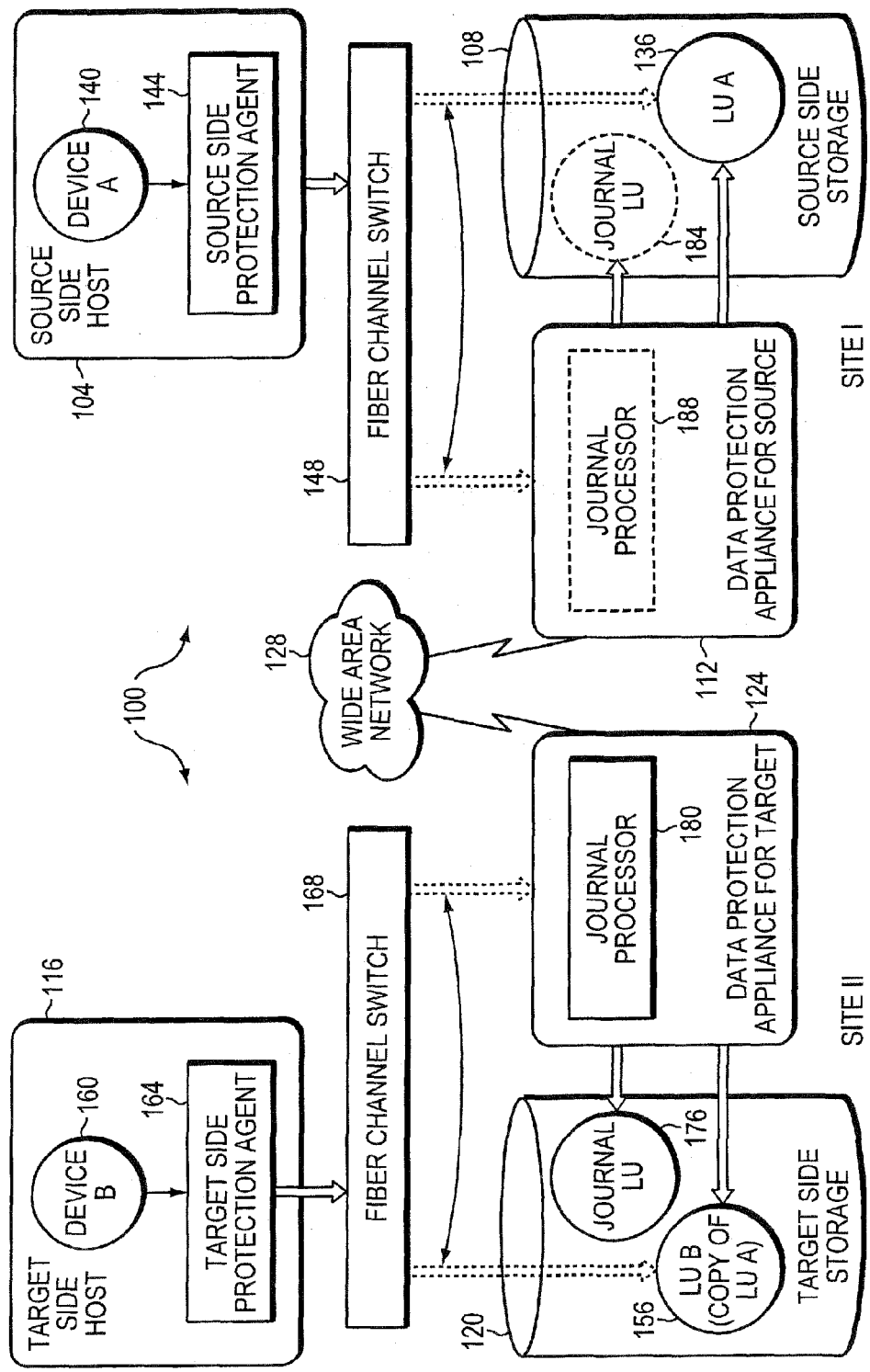
FIG. 1 is a simplified illustration of a data protection system, in accordance with an embodiment of the present invention.

CAS, compare and swap command, is a new SCSI command, which gets as an input the current value of one block and a new value for this one block, if the current value is equal to what is written in the storage the data is replaced with the new value, otherwise command fails. A CAS command may also be called an ATS or atomic test and swap command. The terms CAS and ATS may be used interchangeably herein. This type of command may be used in virtual environments to secure a lock on a virtual space. For example, this command may be used by VMWare to secure access to a virtual environment in a clustered network.

However, replicating the command in a replicated environment may not straight forward. Often, complexity arises due to the redundancy required in a replicated environment. That is, the command must be applied uniformly to both the production environment and the replicated environment.

In an embodiment of the current invention, a notification of the command may be split by a splitter, then command may be sent to the storage, if the CAS returned successful data, the data may be split to the appliance and may be replicated otherwise the data may be discarded.

Typically, virtual clustered file systems implement robust locking to prevent cluster-aware applications from powering on (or otherwise sharing) the contents of a given virtual disk on more than one host at any given time. To do this, a virtual environment may issues a series of commands. First, a RESERVE may be issued to get exclusive access to the device. Once it has the device reserved, READ may be issued to check if the lock is already in use. If the lock is in use, a RELEASE may be issued and the lock may be attempted later. If the lock is available, a WRITE may be issued with some data pattern to set the lock. After completion of the operation, a RELEASE may be issued.

This type of lock may pose a problem in a clustered environment that uses multiple locks on a single LU. For example, there may be multiple partitions on a single LU and each partition may be used by a different host in the cluster, also in a clustered file system like vmfs, many hosts share the same file system and lock must be applied when file system structure changes. In this scenario the RESERVE command blocks all other hosts in the cluster from accessing this LU while a lock is checked and potentially updated. The LU is reserved from the time the RESERVE is received, the data is checked to see if it is already locked, a write to the LBA to set the lock, and the RELEASE command is completed. This could have a performance impact on all of the other hosts trying to access this LU.

Some companies, for example VMware, have proposed a solution to this in their Virtual Infrastructure Integration with Storage Hardware document called Atomic Test and Set (ATS) or Compare and Swap (CAS). The proposed solution is to implement a single SCSI command to perform all 5 steps. This command would transfer from the initiator a block of data used in the compare along with a block of data to write if the compare data matches. This command may atomically read the LBA, compare it to data that was supplied by the initiator and write to the LBA if the data read matches the data that the host sent.

While the ATS command may enter the SCSI standard, it may not solve current problems or problems outlined in a replication space. An embodiment of the current invention enables a version of the ATS command or the CAS command implementing compare and swap logic in a replicated environment. A replicated environment must be able to implement the command on both the production and replication site, accounting for the scenario when the lock command may succeed on production or replication site, but fail on the other site, or vice versa.

In a sample embodiment, the CAS Command may be assembled from two blocks
  1. Compare block
  2. Write block If the compare block is equal to the current block at the storage, then the Write block may be written, otherwise the CAS command may fail with I/O Error. In an embodiment of the current invention, the lock command may be replicated to the replication site, yet be able to be discarded if the command fails on the production site. Replicating the command itself may not be acceptable since the remote storage may not be up to date when command happens some the compare may not compare the correct value.

The following definitions are employed throughout the specification and claims.

ATS Command—an atomic test and set command. Also referred to herein as a CAS command.

BACKUP SITE—a facility where replicated production site data is stored; the backup site may be located in a remote site or at the same location as the production site;

CAS Command—a compare and swap command. Also referred to herein as an ATS command; a CAS command and an ATS command may be used interchangeably in the application.

CLONE—a clone may be a copy or clone of the image or images, drive or drives of a first location at a second location DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

MOH—Marking on host, a mode of the protection agent (splitter), where changes (i.e. meta data) to the storage are tracked in the agent memory and not sent to the external data protection appliance.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located inside the storage array or on a fiber channel switch, or in any other device situated in a data path between a host computer and a storage system What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
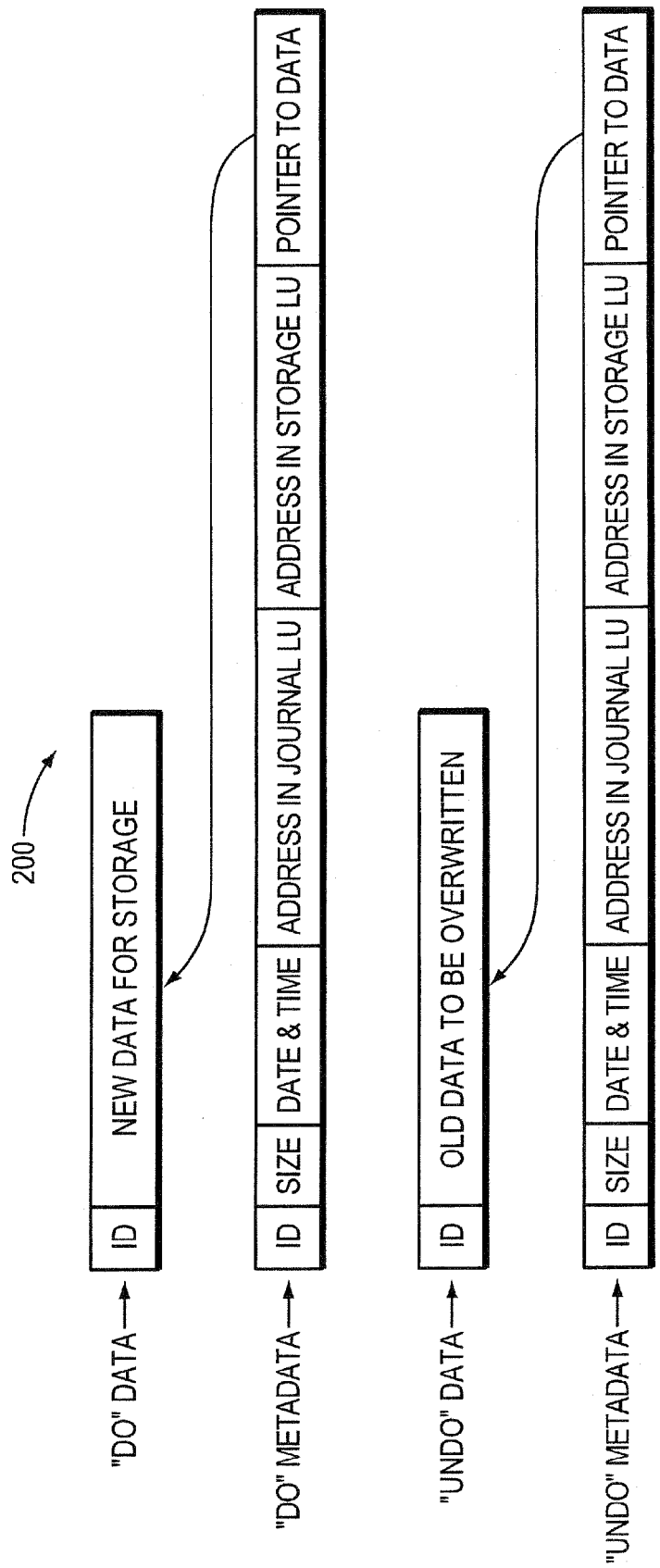
FIG. 2 is a simplified illustration of a write transaction for a journal, in accordance with an embodiment of the present invention.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

CAS/ATS Handle Production

In some embodiments of the current invention, a CAS or ATS command must be able to be sent to the replicated device, before the command is sent to the production site.

This may need to occur to ensure no data is lost if the production site splitter or DPA (or both) crashes before the command is executed.

Figure 3:
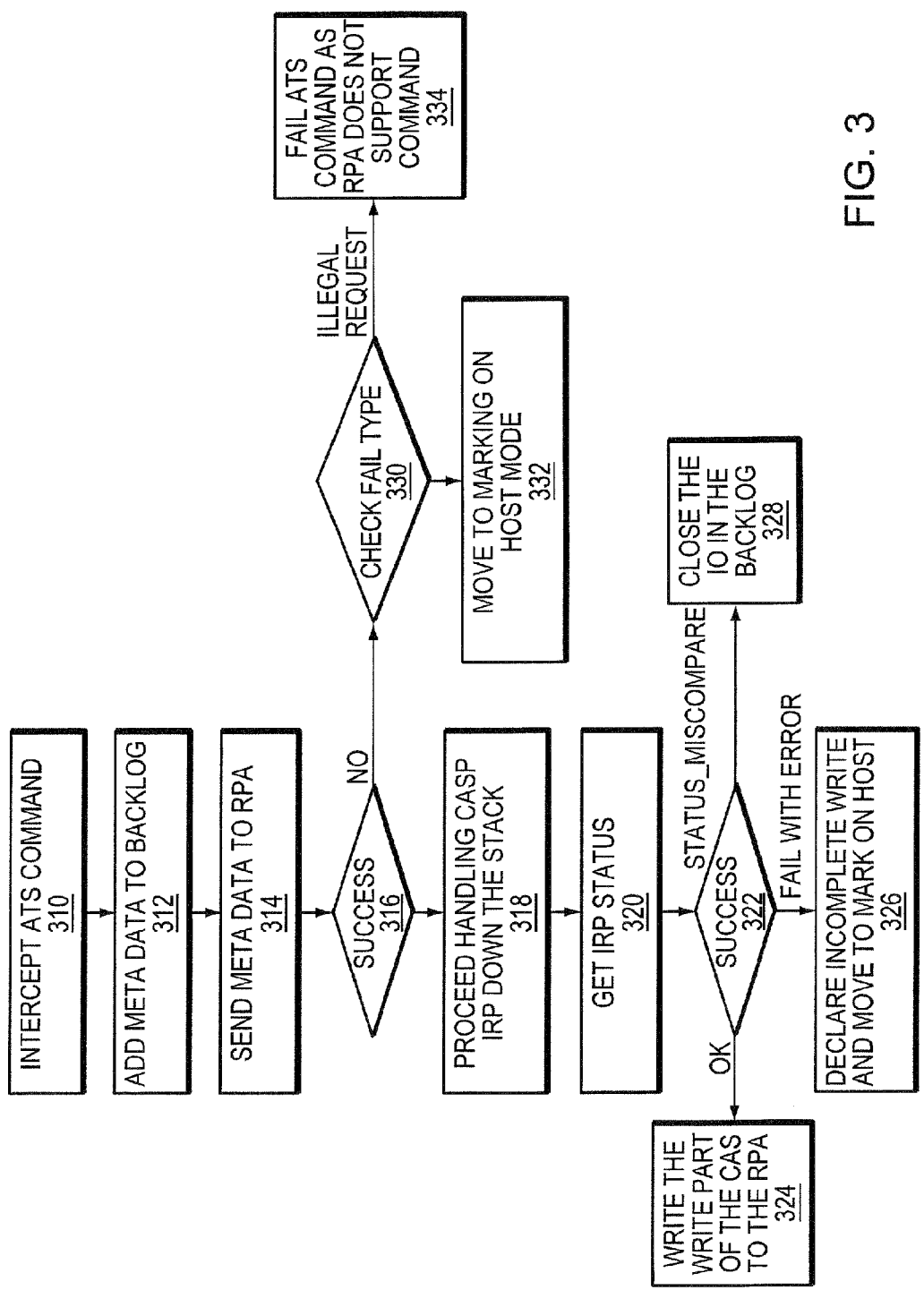
FIG. 3. is a simplified embodiment of a method of the current invention.
Figure 4:
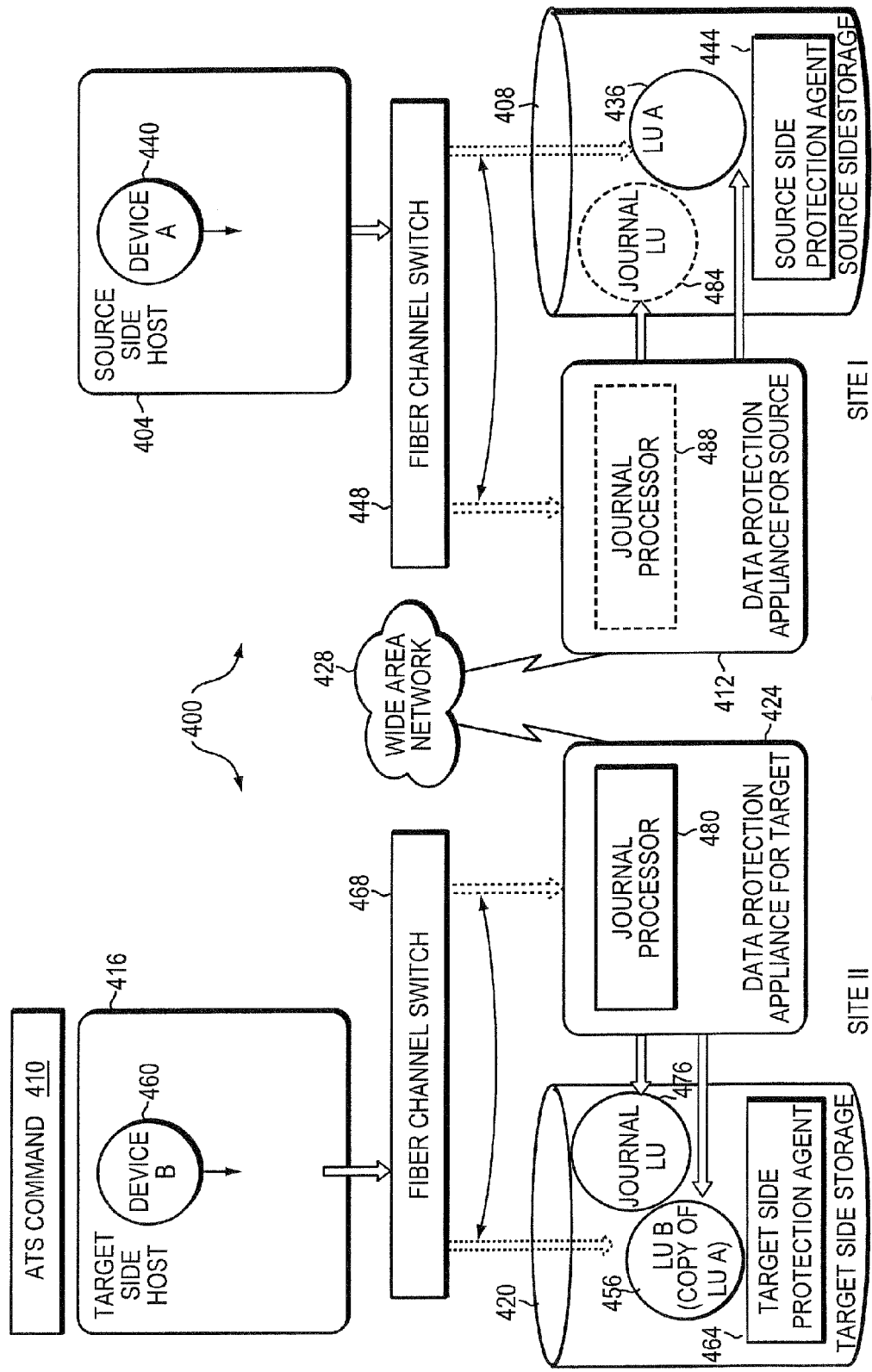
FIG. 4. is a simplified illustration of a data protection system, in accordance with an embodiment of the present invention.

Refer now to the embodiment of FIG. 3, a splitter may intercept 310 the CAS/ATS command. The splitter may add 312 the meta data to the backlog in the splitter memory and the splitter may send 314 the meta data to the RPA. The status of the command may be checked 316. If these commands succeed successfully, processing of the CAS IRP may continue 318 down the stack containing the commands to be executed. In some embodiments, the status of the command will be received 320.

The status of the command may be checked 322. It the status is ok, the write portion of the CAS may be written 324 to the RPA. If the status is a mis-compute error, the IO in the backlog may be closed 328. If the status is the command failed with an error, an incomplete write may be declared and the stack may be moved back 326 to marking on host mode.

If the command was not successfully sent to the RPA, the fail type may be checked 330. In some embodiments, an illegal request may be returned 334. This may result in the ATS command failing since the replication appliance may not support the command. In other embodiments, based on the fail type, the system may move back 322 to marking on host mode.

In further embodiments, when the meta data command arrives at the replication side, the command may be added to the delta mark and when IO arrives its meta data may also be added to the delta marking.

Figure 5:
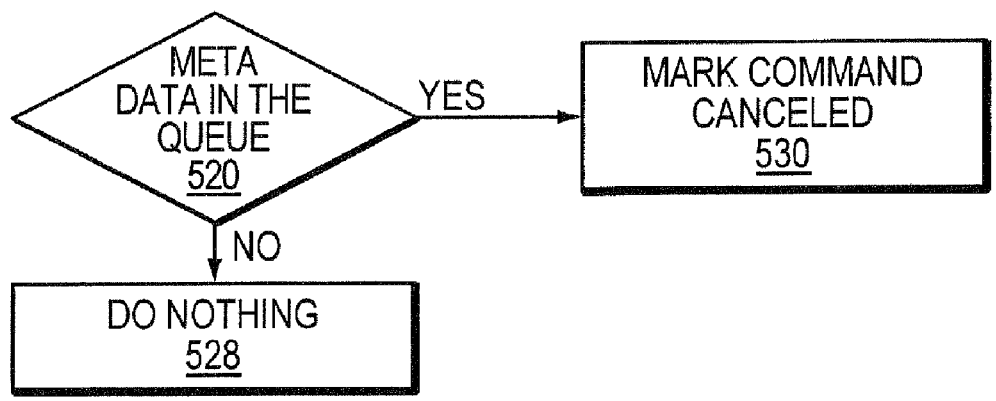
FIG. 5. is an alternative simplified embodiment of a method of the current invention.

Refer now to the embodiment of FIG. 5. In this embodiment, when the user desires to cancel the command, a demand check may occur 520 to see if the meta data command handling completed. If sending meta data to the DPA is active, the meta data command may be marked as canceled, and the CAS command may complete in the splitter backlog memory, the CAS command may not be forwarded to the storage, if the meta data handling completed, command may not be canceled.

Virtual Access on a Data Storage Site, when Splitter Run in the Storage Array

On the remote site, the splitter and DPA allow the user to test access to the remote volumes at a point in time before the user may decide to commit the data and fail over. There may be two types of access modes: Logged access mode or target site processing mode, described herein, and virtual access mode. In virtual access mode, the volume presented to the user may be a virtual volume, the virtual volume may be a set of pointers to the journal and the remote user volumes, which together may describe the volume at a desired point in time, for instance if the users volumes are currently at time 8:00, and the user wants to access point in time 9:00, the virtual image may contain pointers to the volume for all blocks which last changed before 8:00, and may contain pointers to the do stream for all blocks which changed between 8:00 and 9:00, the pointers may point to the location in the do stream where data last changed before 9:00, Similarly if the user wanted to see the image at 7:00, the virtual image may contain pointers to the user volume for the point in time that the image did not change between 7:00 and 8:00 and pointers to the undo stream for the point in time where changes occurred during this period.

The virtual image may be exposed and may be readable and writable. A splitter receiving a write command to the virtual image may forward the write to the DPA, the DPA may write the data to a new stream (the virtual access do stream), and update the pointers for the specific location to the virtual access do stream.

A storage based splitter receiving a read command may do the following:

send a read notify to the DPA, notifying a read is going to reach the DPA, the read offset and the number of blocks to be read (and the volume that is being read (i.e. it may be desired to roll for the DPA to roll the virtual image into a physical image, thus a read from a specific location may block DPA from freeing data from the do/undo stream before a specific read completed).

the splitter may send a write before read command to the DPA, containing the data currently in the storage user volume.

the splitter may issue a read to the location

The DPA may accumulate the write before read information and for all locations where the pointers point to the stream and not to the disk the DPA may update the write before read data and return it as the result to the read command.

When splitter is in the storage array the DPA cannot read from the user volumes while the read command occurs to the same location since a deadlock in the storage array may occur.

On host and switch based splitters the read command may be forwarder to the DPA.

Figure 6:
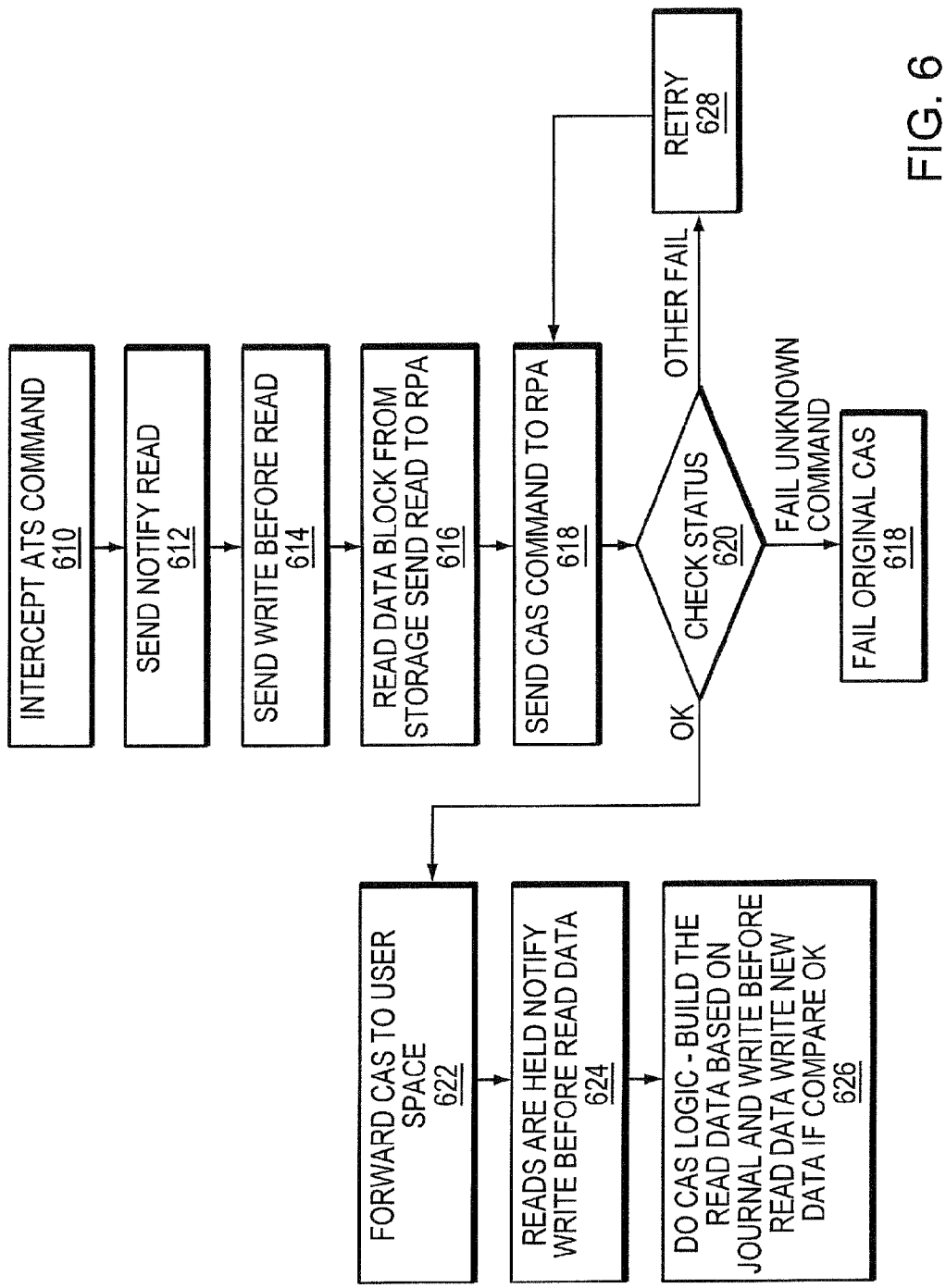
FIG. 6. is an alternative simplified embodiment of a method of the current invention.

Refer to the embodiment of FIG. 6. In this embodiment, the ATS may be intercepted 610. A read notification may be sent 612 to the replication appliance. A send write before read may occur 614. A write before read may be a write command containing the data currently stored in the storage at a specific location, which may be read later. The reason the read before write occurs may be that, when in virtual access mode, the data we read may be partially on the original storage LUN and partially on the journal volume. The appliance may not be able to read from the user volume itself, when splitter is part of the storage array, as the command may cause a deadlock in the storage array software. After the write before read the CAS command may be sent to the DPA. In further embodiments, the CAS command may be sent 618 to the DPA.

The status of the command may be checked 620. If the command status is ok, or status STATUS_MISCOMPARE, the result may return to the host which issued the CAS command. In the status of the command fails 618 with an illegal key, which may denote the command is not supported, the CAS command may be returned as failed with a status identifier that the command is not implemented on the replication device. In other embodiments, if the command fails, the CAS command may be resent 628 to the Replication device to retry the command.

On the appliance side, the appliance may receive the read notify, the read before write and then the CAS command, the CAS may be forwarded 622 to the user space on the appliance. The notification of the write may be held 624 before the read data. The CAS logic may be executed 626. By building the read data based on the journal write before the read data. In some embodiments, the new write data may be executed if the compare command is equivalent, an older version appliance may not recognize the CAS command and return that command is not implemented.

CAS/ATS TSP Mode

On the remote site the splitter and DPA may allow the user to test access to the remote volumes at a point in time before user decides to commit the data and fail over. There may be two type of access modes, in target side processing mode (TSP), the image on a replicated system may be rolled to a particular point in time to let the user access the data at this point in time. In some embodiments, a read may be intercepted by a splitter, in TSP mode the read may be ignored by the splitter and forwarded down the IO stack. A write may be intercepted by the splitter, the data currently written on the storage for the write location may be read from the storage, the data may be forwarded to the DPA, (if the splitter is not located in the storage array, only the meta data of the IO may be sent to the DPA and the DPA may read the undo of this data from the storage volume, when splitter is in the storage array this flow may cause a deadlock, thus storage reads the undo of the data). The DPA may receive the write containing the undo data and may store the data in a TSP undo stream, allowing the user to move undo the changes made to the image.

Figure 7:
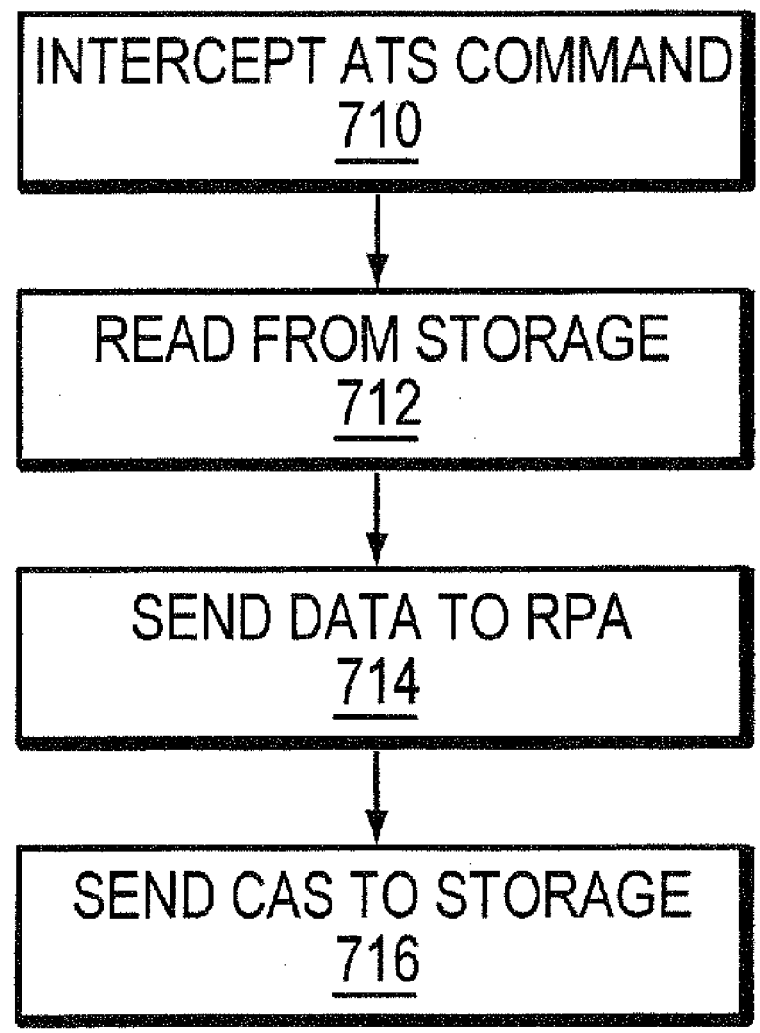
FIG. 7. is an alternative simplified embodiment of a method of the current invention.

Refer now to the embodiment of FIG. 7. In this embodiment, the ATS command may be intercepted 710. The block of data where ATS command is going to check may be read 712 from the storage. The data read from the storage may be sent 714 to the DPA. Then the CAS command may be sent 716 to the storage.

Virtual Access on Other Splitters

Figure 8:
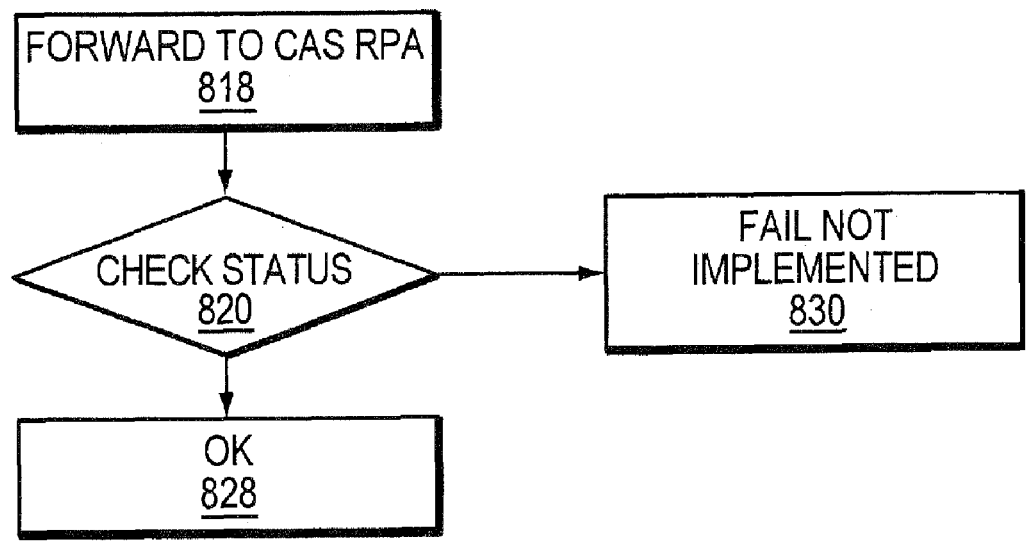
FIG. 8. is an alternative simplified embodiment of a method of the current invention.

Refer to the embodiment of FIG. 8. In this embodiment, on other splitters, when splitter is in virtual access mode, the DPA may perform the CAS command on its own by performing read and write automatically. In this embodiment the CAS may be forwarded 818 to the RPA. The status may be checked 820 to denote whether the command failed 830 as not implemented or whether it executed 828 successfully.

Figure 9:
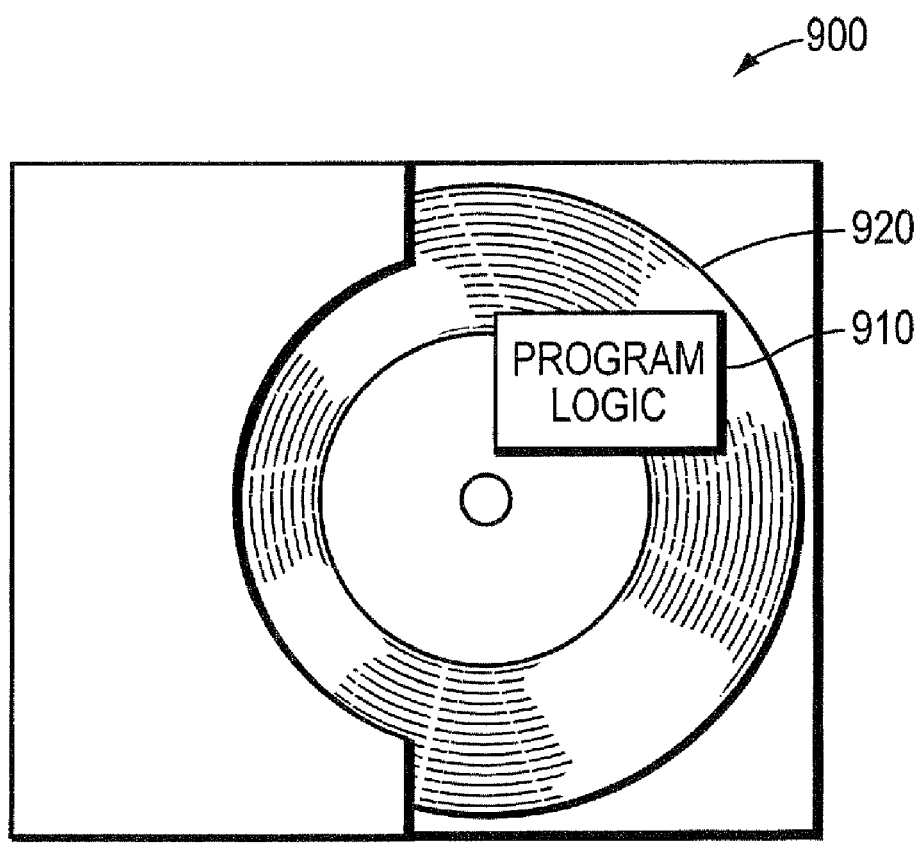
FIG. 9 is an embodiment of the current invention as embodied in program code.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 1, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 9 shows Program Logic 910 embodied on a computer-readable medium 930 as shown, and wherein the Logic is encoded in computer-executable code configured for carrying out the reservation service process of this invention and thereby forming a Computer Program Product 900.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it may be appreciated that, in addition to data replication systems, the optimal journaling policy of the present invention has widespread application to journaling systems including database systems and version control systems.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for executing a command in a replicated environment comprising a replication appliance and a production site, the method comprising:
   intercepting the command at a splitter; wherein the command comprises a atomic test and set (ATS) request;
   adding meta data associated with the command to a backlog;
   sending the meta data to the replication appliance;
   determining success of the meta data at the production site;
   based on a failure of the meta data,
   determining the type of failure;
   based on a determination of a failure, executing a failure determination comprising:
   determining whether the failure is a command not supported command;
   based on a positive determination that the failure is a command not supported, failing the ATS command; and
   based on a negative determination that the command is not supported moving the splitter to marking on host (MOH) mode;
   based on success of the meta data, proceeding with processing of the command at the production site; and sending the ATS command to storage.

2. The method of claim 1 further comprising testing the success of the ATS command.

3. The method of claim 2 wherein based on a successful test of the ATS command, a write part of the command is written to the replication appliance.

4. The method of claim 2 wherein based on the test of the ATS command failing with error, the command is declared incomplete and the replication environment begins to mark on host.

5. The method of claim 2 wherein based on the test of the ATS failing with status STATUS_MISCOMPARE, IO is closed in the backlog.

6. A method for executing a command in a replicated environment, the replicated environment running in virtual access mode, the method comprising:
   intercepting the command at a splitter; wherein the command comprises an atomic test and set (ATS) request;
   sending read notification to a replication appliance;
   reading a block associated with the command on storage;
   sending write execution before read command, containing the data read from the storage;
   sending the ATS command to the replication appliance; and
   checking the status of the command and returning status to a command generator for the ATS command.

7. The method of claim 6 further comprising based on the checking of the status is ok, forwarding the ATS to the user space of the replication appliance memory.

8. The method of claim 7 further comprising based on the checking of the status is ok, holding write before reads IO in the replication appliance memory until notification of ATS data.

9. The method of claim 7 further comprising based on the checking of the status is ok, executing ATS logic; wherein the read data is based on journal data and the executed write before read data, returning ATS status to the splitter.

10. The method of claim 6 further comprising based on the checking of the status is a failure command in the splitter, determining if the failure is an not supported command failure; and based on an unknown command failure, notifying failure of the ATS command.

11. The method of claim 6 further comprising based on the checking of the status is not an no supported command failure, retrying to execute the ATS command.

12. A method for executing a command in a replicated environment comprising a replication appliance and a production site, the replicated environment running in target side processing mode, the method comprising:
 intercepting the command at a splitter; wherein the command comprises atomic test and set;
 reading from a volume;
 sending the data read from the volume to the replication appliance; and
 sending the command to the volume.

13. A computer program product for executing a command in a replicated environment comprising a replication appliance and a production site, the replicated environment running in target side processing mode, the program product comprising:
 a non-transitory computer-readable storage medium encoded with computer-executable program code enabling:
  intercepting the command at a splitter; wherein the command comprises atomic test and set
   reading from a volume;
   sending the data read from the volume to the replication appliance; and
   sending the command to the volume.

14. A computer program product for executing a command in a replicated environment comprising a replication appliance and a production site, the program product comprising:
 a non-transitory computer-readable storage medium encoded with computer-executable program code enabling:
  intercepting the command at a splitter; wherein the command comprises a atomic test and set (ATS) request;
  adding meta data associated with the command to a backlog;
  sending the meta data to the replication appliance;
  determining success of the meta data at the production site;
  based on a failure of the meta data,
   determining the type of failure;
   based on a determination of a failure, executing a failure determination comprising:
    determining whether the failure is a command not supported command;
    based on a positive determination that the failure is a command not supported, failing the ATS command; and
    based on a negative determination that the command is not supported moving the splitter to marking on host (MOH) mode;
  based on success of the meta data, proceeding with processing of the command at the production site; and sending the ATS command to storage.

15. The computer product of claim 14 further comprising testing the success of the ATS command.

16. The computer product of claim 14 wherein based on a successful test of the ATS command, a write part of the command is written to the replication appliance.

17. A computer program product for executing a command in a replicated environment, the replicated environment running in virtual access mode, the program product comprising:
 a non-transitory computer-readable storage medium encoded with computer-executable program code enabling:
  intercepting the command at a splitter; wherein the command comprises an atomic test and set (ATS) request;
  sending read notification to a replication appliance;
  reading a block associated with the command on the storage;
  sending write before read command, containing data read from the storage;
  sending the ATS command to the replication appliance; and
  checking the status of the command and returning status to a command generator for the ATS command.

18. The computer product of claim 17 further comprising based on the checking of the status is ok, forwarding the ATS to user space of the replication appliance memory.

19. The computer product of claim 17 further comprising based on the checking of the status is ok, holding write before reads IO in the replication appliance memory until notification of ATS data.

20. The computer product of claim 17 further comprising based on the checking of the status is ok, executing ATS logic; wherein the read data is based on journal data and the executed write before read data, returning ATS status to the splitter.

* * * * *